United States Patent [19]

Pertuit

[11] E Re. 28,877

[45] Reissued June 22, 1976

[54] ELECTRIC CABLE CONNECTOR

[76] Inventor: John R. Pertuit, Luling, La. 70070

[22] Filed: Sept. 6, 1974

[21] Appl. No.: 503,671

Related U.S. Patent Documents

Reissue of:

[64] Patent No.: 3,693,138
Issued: Sept. 19, 1972
Appl. No.: 116,761
Filed: Feb. 19, 1971

[52] U.S. Cl. ..... 339/213 R; 339/242; 339/272 A

[51] Int. Cl.[2] ..... H01R 13/50

[58] Field of Search ..... 339/213 R, 74 R, 241, 339/242, 248, 249 R, 249 A, 250, 253, 254, 263 R, 266, 200 R, 201, 205, 272 R, 272 A

[56] References Cited

UNITED STATES PATENTS

| | | | |
|---|---|---|---|
| 2,301,447 | 12/1939 | Parker et al. | 339/205 |
| 2,392,438 | 1/1946 | Wade | 339/205 |
| 2,724,814 | 11/1955 | Stubbers | 339/198 G |
| 2,767,383 | 10/1956 | Killian et al. | 339/198 S |
| 2,911,616 | 11/1959 | Townsend | 339/223 R |
| 3,078,438 | 2/1963 | Szental | 339/198 R |
| 3,350,677 | 10/1967 | Daum | 339/149 |
| 3,452,317 | 6/1969 | Carlson | 339/95 R |

FOREIGN PATENTS OR APPLICATIONS

| | | | |
|---|---|---|---|
| 844,804 | 5/1939 | France | 339/272 R |

*Primary Examiner*—Joseph H. McGlynn
*Assistant Examiner*—James W. Davie
*Attorney, Agent, or Firm*—Berman, Aisenberg & Platt

[57] ABSTRACT

An electric cable connector which will accept cable ends of the type having a connector lug secured thereto. The connector lugs are clamped into a conducting body portion which is covered by a cylindrical insulating cover detachably secured thereon. In one form of the invention the body is solid and has opposed slots for receiving the lugs. In the other form of the invention the body is split and is forced together by rotating the insulator sleeve with respect to the body. In another form of the invention the body is split and is clamped together by a transverse bolt to clamp the lugs therebetween.

5 Claims, 11 Drawing Figures

INVENTOR.
JOHN R. PERTUIT,
BY
Berman, Davidson & Berman,
ATTORNEYS.

JOHN R. PERTUIT,

Berman, Davidson & Berman,

S.

JOHN R. PERTUIT,

Berman, Davidson & Berman,

S.

INVENTOR
JOHN R. PERTUIT,
BY
Berman, Davidson & Berman,
ATTORNEYS.

ELECTRIC CABLE CONNECTOR

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to electric cable connectors particularly those which are used in electric welding.

2. Summary of the Invention

In the present invention electric cables having connector lugs secured thereto are inserted into a body and clamped therein by clamp set screws, by rotating the insulator sleeve to clamp body halves together or by a transverse bolt to clamp body halves together. In the form of the invention having the body halves clamped together by rotation of the insulating sleeve, the clamping jaws may optionally clamp on the connector lug or directly on the wire.

The primary object of the invention is to provide an electric cable connector for use with electric welding cable of the type normally having connector lugs attached thereto for quickly, conveniently and efficiently connecting the lugs through a conductor body.

Other objects and advantages will become apparent in the following specification when considered in the light of the attached drawings.

DESCRIPTION OF THE PREFERRED EMBODIMENTS

Figure 1:
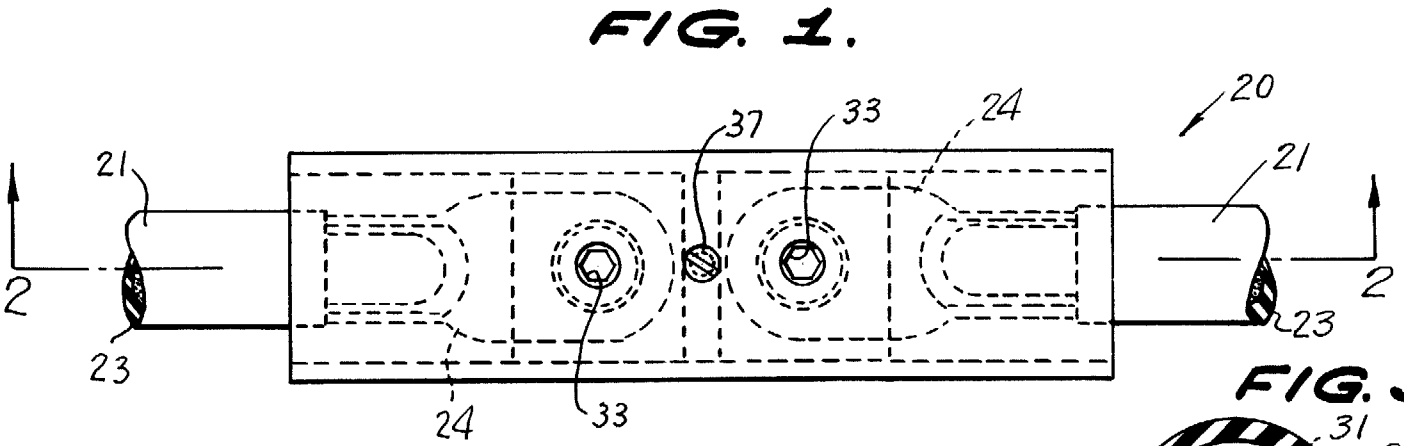
FIG. 1 is a top plan view of the invention.

Referring now to the drawings in detail wherein like reference characters indicate like parts throughout the several figures the reference numeral 20 indicates generally an electric cable connector constructed in accordance with the invention.

The electric cable connector 20 is adapted for use with heavy duty electric cables 21 of the type used for electric welding and the like. The electric cable 21 includes a relatively large conductor wire 22 covered by an insulating cover 23. The wire 22 extends beyond the insulating cover 23 at one end and has a lug 24 of conventional design clamped onto the wire 22. The lug 24 includes a generally flat tongue 25 having a transverse bore 26 extending therethrough.

The construction of the cable 21 and lug 24 is conventional.

A generally cylindrical body 27 is formed of conducting metal and has a pair of transversely extending slots 28 opening through the opposite ends thereof. The open ends of the slots 28 are flared at 29 to assist in inserting the tongue 25 of the lug 24 into the slot 28. A transverse threaded bore 30 is formed in the body 27 adjacent each end thereof communicating centrally with each of the slots 28. A set screw 31 is threaded into each of the threaded bores 30 and has a domed inner end 32 for engaging in the transverse bores 26 of the lug 24 to clamp them in the slots 28. The set screw 31 has an Allen socket 33 extending axially into the end thereof opposite the dome 32 to permit an Allen wrench to be engaged therewith for tightening the set screw 31 onto the tongue 25 of the lug 24.

A generally cylindrical insulating sleeve 34 has a length sufficient to cover the body 27, both lugs 24 and extend over a portion of the insulating cover 23 of each of the cables 21. The inner diameter of the sleeve 34 engages the outer diameter of the cylindrical body 27 and a set screw 35 extends through a bore 36 in the sleeve 34 and into the body 27. The head 37 of the set screw 36 extends above the body 27 into the bore 36 to lock the sleeve 34 onto the body. 27. Bores 37 formed in the sleeve 34 align with the sockets 33 of the set screws 31 to permit the set screws 31 to be loosened or tightened without removing the sleeve 34 from the body 27.

While the body 27 has been shown as cylindrical and the sleeve 34 also shown as cylindrical it should be understood that any other desired cross-sectional shape may be used such as hexagonal, square and the like when desired.

Figure 3:
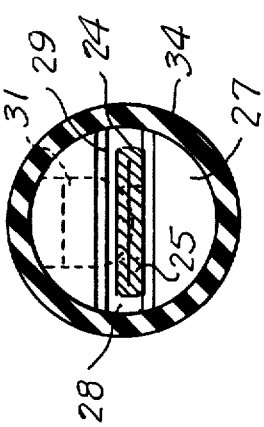
FIG. 3 is a transverse sectional view taken along the line 3—3 of FIG. 2, looking in the direction of the arrows.
Figure 2:
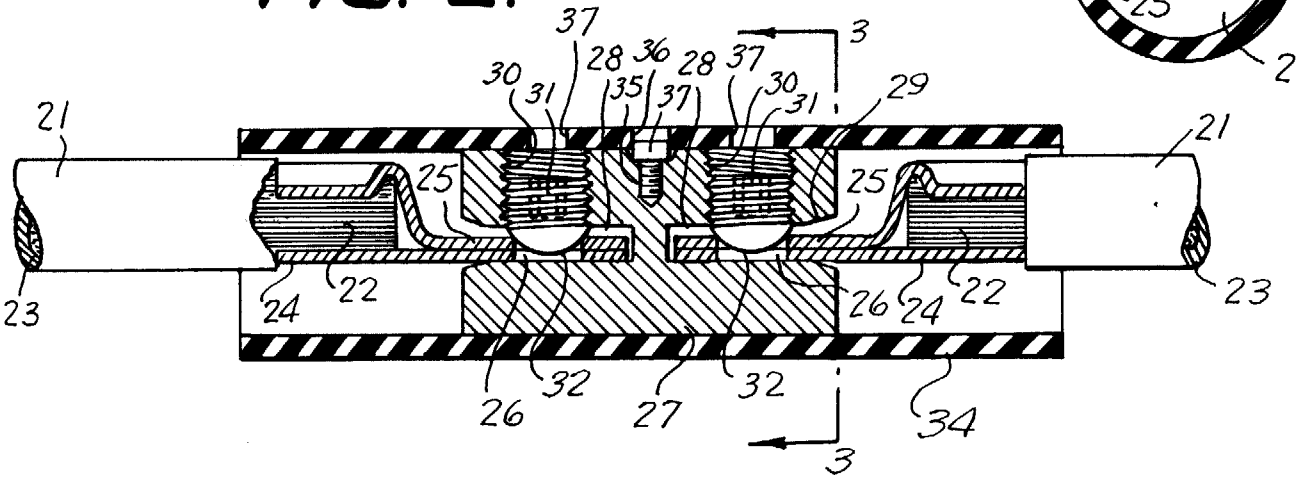
FIG. 2 is a vertical sectional view taken on the line 2—2 of FIG. 1, looking in the direction of the arrows.
Figure 5:
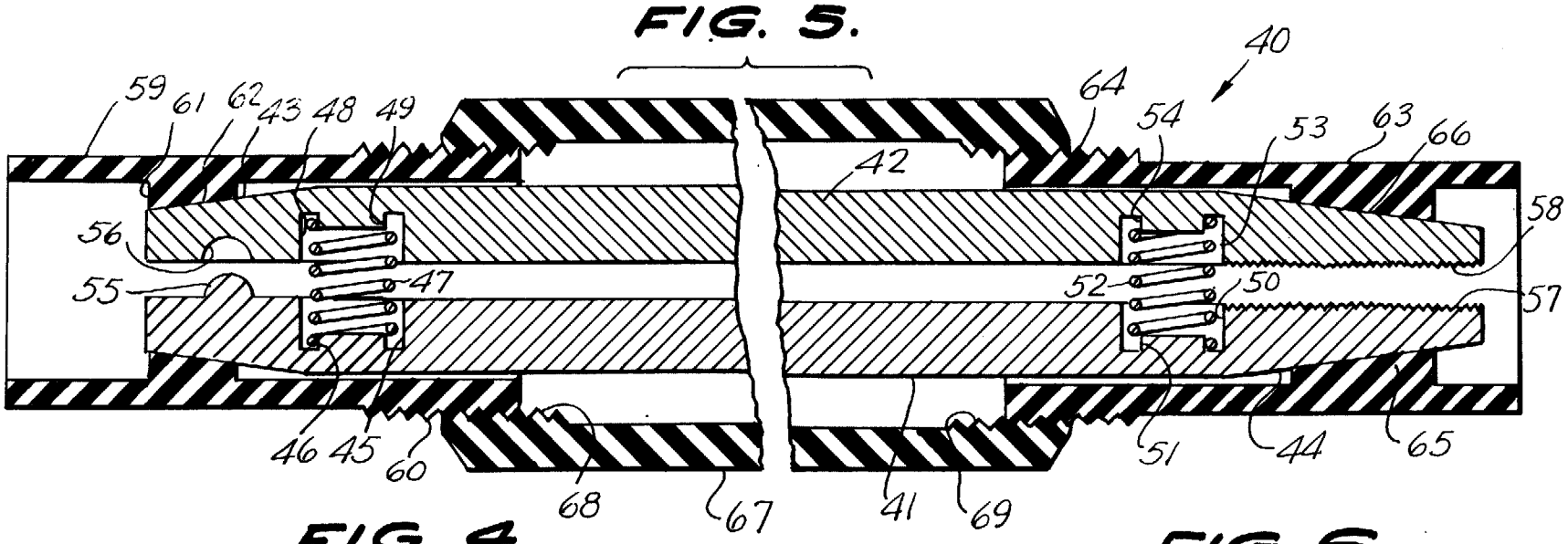
FIG. 5 is a longitudinal sectional view taken along the line 5—5 of FIG. 4, looking in the direction of the arrows.
Figure 6:
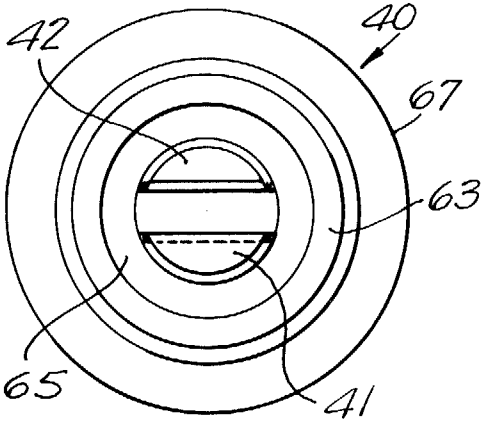
FIG. 6 is a view similar to FIG. 4 of the opposite end of the connector.
Figure 4:
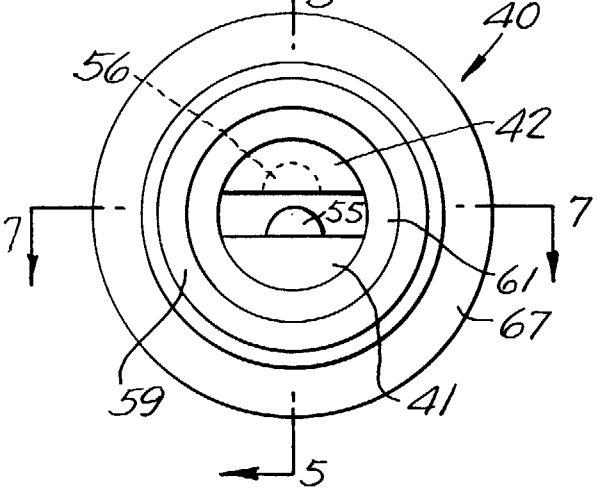
FIG. 4 is an end elevation of a modified form of the invention.
Figure 7:
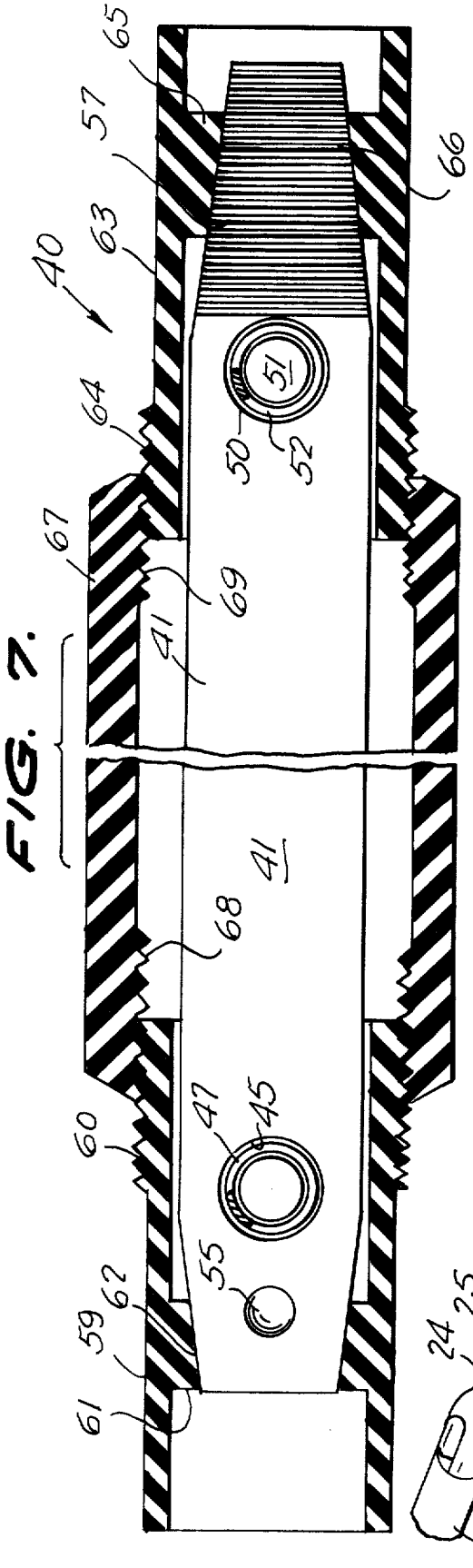
FIG. 7 is a longitudinal sectional view taken along the line 7—7 of FIG. 4, looking in the direction of the arrows.
Figure 8:
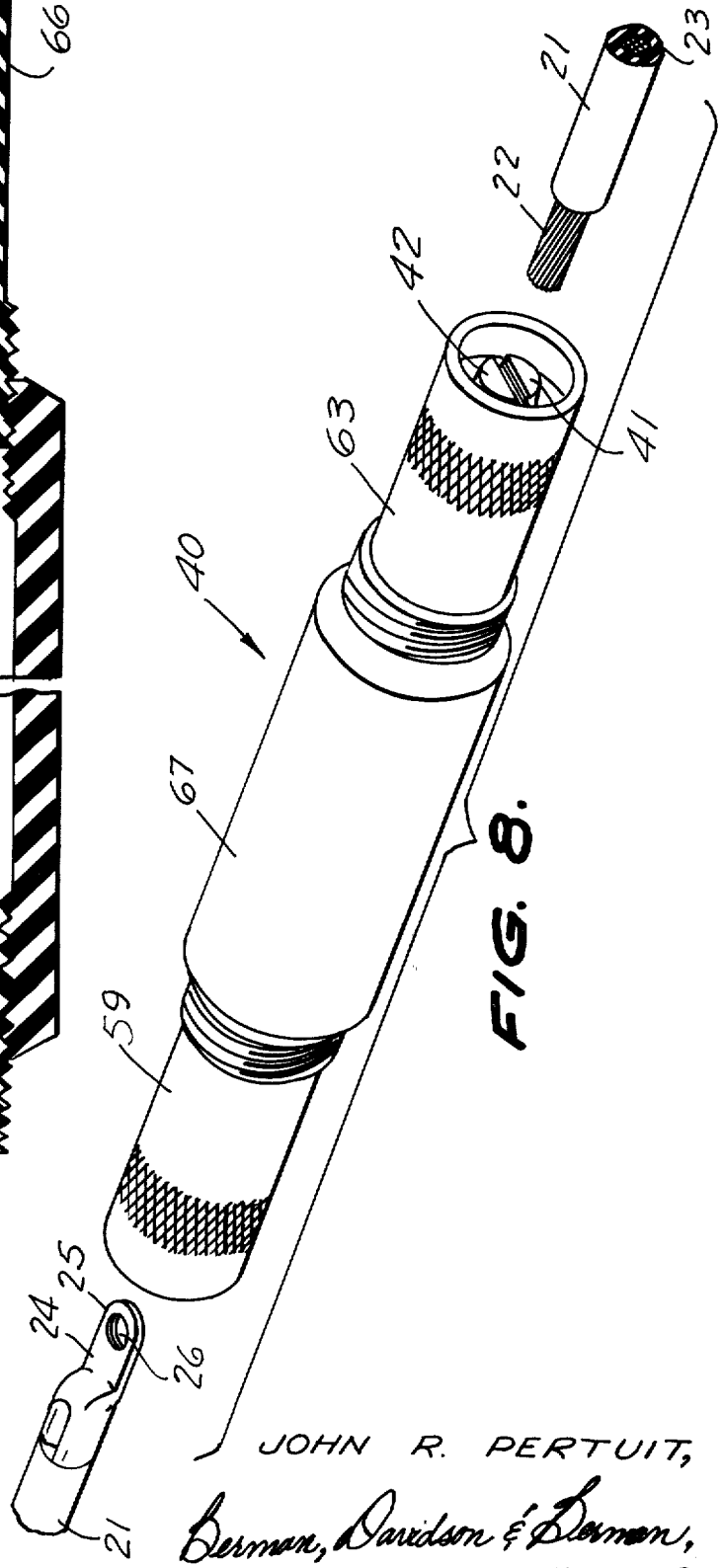
FIG. 8 is a perspective view of the structure illustrated in FIG. 4.

In the use and operation of the invention illustrated in FIGS. 1 through 3 the sleeve 34 is assembled onto the body 27 and the set screw 35 is inserted through the bore 36 to lock the sleeve 34 to the body 27. The set screws 31 are backed off in the threaded bores 30 to open the slots 28 to permit tongues 25 of the lugs 24 to be inserted therein. The set screws 31 are then moved downwardly in the threaded bores 30 by means of an Allen wrench (not shown) until they have clamped tightly against the tongues 25 engaging in the transverse bores 26 thereof. When it is desired to disconnect the cables 21 it is only necessary to loosen one of the set screws 31 so that the cooperating lug 24 may be withdrawn therefrom.

Referring now to FIGS. 4 through 8 a modified electric cable connector is illustrated generally at 40. The electric cable connector 40 is adapted for use with electric cables 21 as described in FIGS. 1 through 3.

The electric cable connector 40 includes a longitudinal body half 41 and a longitudinal body half 42 which together are of generally cylindrical form and have conically tapering end portions 43, 44. The body half 41 has a bore 45 adjacent the conical end portion 42 opening through the center face thereof. The bore 45 as a cylindrical boss 46 formed at its inner end on which to mount one end of a compression coil spring 7. A bore 48 is formed in the body half 42 in axially ligned relation to the bore 45 and has a boss 49 ormed in its inner end to receive the opposite end of ne compression coil spring 47. The coil spring 47 normally urges the body halves 41, 42 apart.

A bore 50 is formed in the body half 41 adjacent the onical end 44 thereof and opening through the inner ace of the body half 41. A cylindrical boss 51 is formed n the inner end of the bore 50 and a compression coil pring 52 is mounted thereon. A bore 53 is formed in ne body half 42 in axially aligned relation to the bore 0 and has a boss 54 formed in its inner end and the ompression coil spring 52 has its opposite end nounted thereon. The compression spring 52 normally rges the body halves 41, 42 apart.

The body half 41 adjacent the tapered end 43 is rovided with a dome 55 extending toward the body alf 42 and the body half 42 is provided with a semipherical socket 56 aligned with the dome 55 to receive he dome 55 when the body half 41 is brought into ngagement with the body half 42.

The conical end 44 of the body halves 41, 42 have heir inner opposed faces serrated at 57, 58 respecively for reasons to be assigned. An insulating generlly cylindrical clamping sleeve 59 is externally hreaded at 60 on one end thereof and has a reduced liameter portion 61 formed internally thereof with a onical opening 62 extending therethrough for engagenent with the conical taper 43 on the body halves 41, 2.

A clamping sleeve 63 is externally threaded at 64 at ne end thereof and has a reduced diameter portion 65 ormed internally thereof with a conical opening 66 xtending therethrough for cooperation with the coniial taper 44 of the body halves 41, 42. The threads 60 nd the threads 64 are formed oppositely for reasons to e assigned.

A generally cylindrical insulating sleeve 67 is interally threaded at 68 with threads to cooperate with the hreads 60 and is internally threaded at its opposite end t 69 to cooperate with the threads 64. Rotation of the leeve 67 about its axis will draw the clamping sleeve 59 and the clamping sleeve 63 inwardly when rotated in ne direction and force them outwardly when rotated n the opposite direction. Inward movement of the lamping sleeve 59, 63 toward each other causes the onical openings 62, 66 to force the tapered ends 43, 4 toward each other to bring the body halves 41, 42 nto contact. As the clamping sleeve 59, 63 are moved way from each other in an outward direction the prings 47, 52 force the body halves 41, 42 apart rease anything clamped therebetween. The dome 55 on he body half 41 engages through the bore 26 of one of he lugs 24 and as the body halves 41, 42 are drawn ogether the tongue 25 is clamped tightly therebeween. At the opposite end of the connector 40 the vire 22 is engaged between the serrated faces 57, 58 espectively of the body halves 41, 42 and is clamped herebetween by axial movement of the clamping leeve 63 with respect to the body halves 41, 42.

Figure 9:
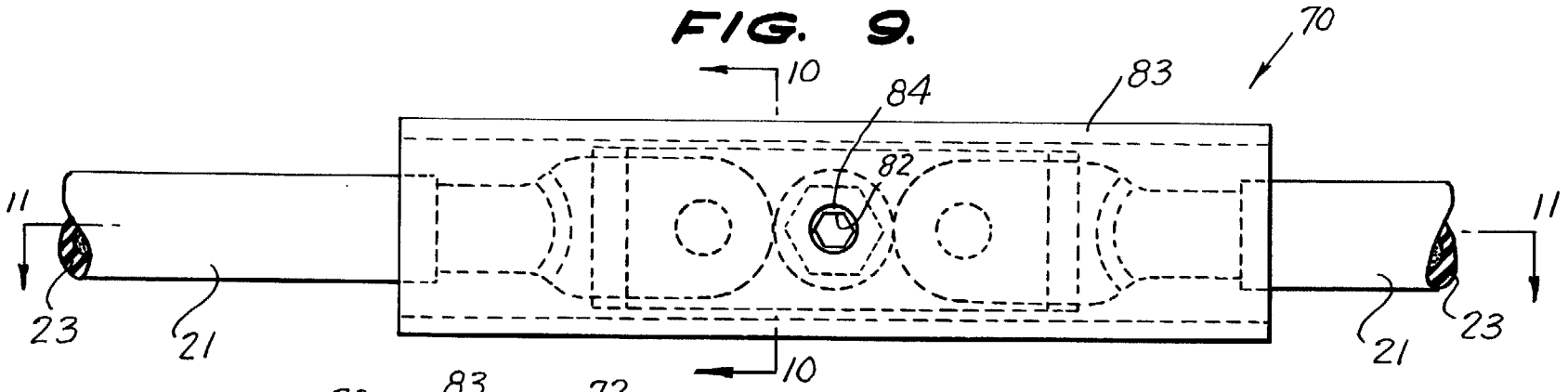
FIG. 9 is a side elevational of a modified form of the invention.
Figure 10:
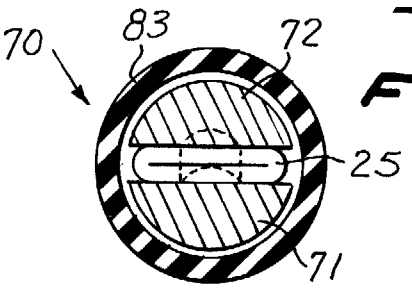
FIG. 10 is a transverse sectional view taken along the line 10—10 of FIG. 9, looking in the direction of the arrows.
Figure 11:
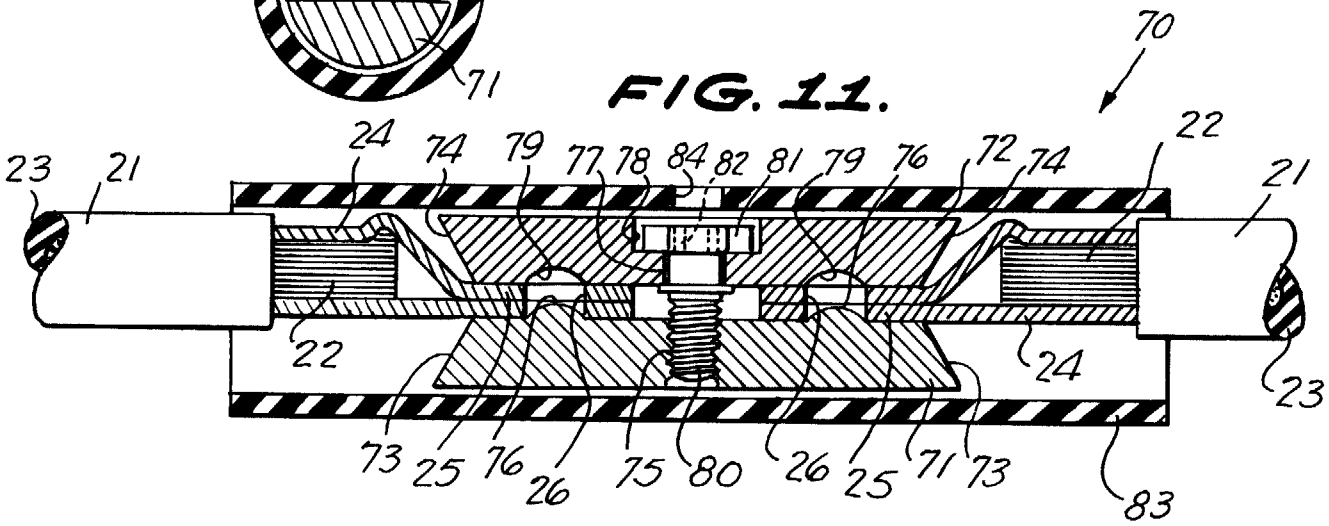
FIG. 11 is a longitudinal sectional view taken along the line 11—11 of FIG. 9, looking in the direction of the arrows.

Referring now to FIGS. 9 through 11 another modied cable connector is illustrated generally at 70. The able connector 70 is adapted for use with electric ables 21 as described in the preferred form of the nvention, illustrated in FIGS. 1 through 3.

The cable connector 70 includes a longitudinal extending body half 71 and a longitudinally extending body half 72 which together are generally cylindrical in outer form.

The body half 71 has its opposite end portions inwardly tapered at 73 and the body half 72 has its opposite end portions inwardly tapered at 74.

The body half 71 has a central threaded bore 75 extending therethrough and has a pair of domes 76 formed thereon adjacent the opposite ends thereof. The body half 72 has a central bore 77 extending therethrough in axially aligned relation with the threaded bores 75 and has a counter bore 78 communicating with the outer end thereof. The body half 72 has a pair of sockets 79 of semi-spherical shape arranged in aligned relation with the domes 76 to encompass the dome 76 when the body halves 71, 72 are in engagement with each other.

A clamping bolt 80 extends through the bore 77 of the body half 72 and into the threaded bore 75 of the body half 71 with its head 81 engaged in the counter bore 78 so that the body halves 71, 72 may be clamped together thereby. The head 81 has an Allen socket 82 formed therein to receive an Allen wrench (not shown) for tightening and loosening and the clamping bolt 80.

A generally cylindrical insulating sleeve 83 is engaged over the body halves 71, 72 and has a length sufficient to extend over the insulation 23 of the electric cables 21 at each end thereof. The sleeve 83 has a central transverse bore 84 extending therethrough in axially aligned relation to the clamping bolt 80 to permit the clamping bolt 80 to be adjusted with the sleeve 83 in position overlying the body halves 71, 72.

In the use and operation of the invention lugs 24 are engaged with their tongues 25 between the body halves 71, 72 and with the domes 76 projecting upwardly into the bores 26 in the tongues 25. The clamping bolt 80 is tightened to establish a clamping relation between the body halves 71, 72 and the lugs 24.

The body halves 71, 72 in the form of the invention illustrated in FIGS. 9 through 11 and the body halves 41, 42 in the form of the invention illustrated in FIGS. 4 through 8 are formed of highly conductive metal to establish a good connection between the cables 21 connected thereby.

Having thus described the preferred embodiments of the invention it should be understood that numerous structural modifications and adaptations may be resorted to without departing from the spirit of the invention.

What is claimed is:

1. An electric cable connector for connecting electric cables of the type having a lug secured to the end thereof with the lug having a flat tongue extending outwardly therefrom and a transverse bore extending through the tongue comprising an elongate conductive body, transverse generally flat slots formed in opposite ends of said body and extending transversely thereacross to receive the tongues of the lugs said slots having flared outer ends for guiding said tongues on inserting said tongues in said slots, a pair of set screws threaded in said body for clamping said tongue in said slot, said set screws having domed inner ends for engagement in the transverse bores of said tongues, a generally cylindrical insulating sleeve encompassing said body and said lugs, and set screw means for locking said sleeve to said body.

*2. An electric cable connector for connecting electric cables of the type having a lug secured to the end thereof with the lug having a flat tongue extending outwardly therefrom and a bore extending through the tongue, comprising an elongate conductive body, a generally flat slot formed in one end of said body and extending transversely thereacross to receive the tongue of a lug, said flat slot extending completely across and opening to the sides as well as to the end of said elongate conductive body, clamping means movable in said body for clamping said tongue in said slot, said clamping means having a domed inner end for engagement in the bore of said tongue, a generally tubular insulating sleeve encompassing said*

*body and said lug, and means for locking said sleeve to said body.*

*3. An electric cable connector according to claim 2, wherein said clamping means comprises a set screw threaded in said body.*

*4. An electric cable connector according to claim 3, wherein said means for locking said sleeve to said body comprises a set screw.*

*5. An electric cable connector according to claim 2, wherein said slot has a flared outer end for guiding said tongue on inserting said tongue in said slot.*

* * * * *